US008255827B2

(12) United States Patent  (10) Patent No.: US 8,255,827 B2
Malik  (45) Date of Patent: Aug. 28, 2012

(54) DYNAMIC FEATURE PRESENTATION BASED ON VISION DETECTION

(75) Inventor: Manish Malik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 12/359,850

(22) Filed: Jan. 26, 2009

(65) Prior Publication Data

US 2010/0191727 A1  Jul. 29, 2010

(51) Int. Cl.
*G06F 3/048* (2006.01)
(52) U.S. Cl. .................................. 715/789; 715/788
(58) Field of Classification Search .................. 715/788, 715/789

See application file for complete search history.

(56) References Cited

U.S. PATENT DOCUMENTS

| | | | |
|---|---|---|---|
| 6,067,069 A | 5/2000 | Krause | |
| 6,243,076 B1 | 6/2001 | Hatfield | |
| 6,269,361 B1 * | 7/2001 | Davis et al. ........................ | 1/1 |
| 6,577,329 B1 | 6/2003 | Flickner | |
| 6,608,615 B1 * | 8/2003 | Martins ........................ | 345/156 |
| 7,363,302 B2 * | 4/2008 | Lester ............................ | 725/42 |
| 7,685,019 B2 * | 3/2010 | Collins ..................... | 705/14.42 |
| 7,805,429 B2 * | 9/2010 | Abrams et al. ................ | 707/706 |
| 7,881,493 B1 * | 2/2011 | Edwards et al. .............. | 382/103 |
| 2003/0046401 A1 | 3/2003 | Abbott | |
| 2003/0149937 A1 * | 8/2003 | McElfresh et al. ........... | 715/517 |
| 2008/0004725 A1 | 1/2008 | Wacker | |
| 2008/0208685 A1 * | 8/2008 | Hamilton et al. .............. | 705/14 |
| 2008/0228819 A1 * | 9/2008 | Minnis et al. ............. | 707/104.1 |
| 2009/0037955 A1 * | 2/2009 | Green et al. .................... | 725/42 |
| 2010/0050098 A1 * | 2/2010 | Turner ........................... | 715/763 |
| 2010/0070872 A1 * | 3/2010 | Trujillo ........................ | 715/745 |
| 2010/0158097 A1 * | 6/2010 | Pascal et al. .................. | 375/240 |

OTHER PUBLICATIONS

Cristina Conati, et al. "Using Eye-tracking Data for High-Level User Modeling in Adaptive Interfaces", p. 1-4, http://www.cs.washington.edu/homes/samershi/papers/AAAI2007.pdf, 2007.
Krzysztof Z. Gajos, et al. "Decision-Theoretic User Interface Generation", pp. 1-5, Association for the Advancement of Artificial Intelligence, http://uwnews.org/relatedcontent/2008/July/rc_parentID42817_thisID42818.pdf, 2008.
"Microsoft on Eye Tracking" http://www.etre.com/blog/2006/10/microsoft_on_eye_tracking/, Oct. 5, 2006.
Jian Wang, "Integration of Eye-gaze, Voice and Manual Response in Multimodal User Interface", pp. 3938-3942, Department of Psychology, National Key Laboratory of Human Factors, Hangzhou University, http://ieeexplore.ieee.org/iel3/4021/11543/00538404.pdf?tp=&isnumber=&arnumber=538404&htry=1, 1995.

* cited by examiner

*Primary Examiner* — Weilun Lo
*Assistant Examiner* — Rashedul Hassan
(74) *Attorney, Agent, or Firm* — Shook, Hardy & Bacon L.L.P.

(57) ABSTRACT

Computer-readable media, computerized methods, and graphical user interfaces (GUI's) for interactively presenting features within the panes of a display area rendered in a GUI workspace are provided. Initially, a computing device memory is inspected to discover a profile that accommodates a user-visual pattern. When the profile is not discovered, a default page layout is retrieved and communicated to the display device for presentation within the display area. If the profile is discovered, commonly viewed screen locations, based upon a frequency of eye fixation upon each of the screen locations, are ordered. Contextually relevant features are selected for presentation within the display area. The selected features are ranked based on predetermined criteria and each associated with the commonly viewed screen locations by comparing the ranking with the ordering. A page layout is constructed by spatially placing the features in proximity to the screen locations associated therewith, and is rendered within the display area.

20 Claims, 6 Drawing Sheets

DYNAMIC FEATURE PRESENTATION BASED ON VISION DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, applications provide a variety of utilities that assist in formatting display areas (e.g., application windows, browser windows, and the like) within a GUI workspace being presented at a display device (e.g., computer monitor, screen on a mobile device, and the like). Often, the applications configure their display areas consistent with a pre-defined presentation structure. For example, with reference to a web browser application, an advertisement may be rendered at a top banner position, featured web addresses may be rendered in a right-side rail position, and search results may be rendered in a lower-central position. Because, the decisions of where to place these features (e.g., advertisement, featured web addresses, and search results) are predefined and concretely set within the architecture of the web browser application, the same display area configuration is shown to all users. That is, the features are displayed in positions within the display area irrespective of a user's individual vision pattern, which can lead to customer and/or advertiser dissatisfaction. For instance, advertiser dissatisfaction may arise when a search engine positions advertisements at the top banner position of the display area, while many potential customers avoid scanning the top banner position because they are accustomed to finding the search results in the lower-central position of the display area. As such, the customer's do not notice the advertisement, thereby depriving the advertiser of potential revenue.

Conventional mechanisms for arranging features within the display area are labor-intensive (e.g., requiring a considerable amount of user-initiated input actions) and are not fluid, flexible, or efficient. Further, these conventional mechanisms are ad-hoc solutions that cannot dynamically react to a user's visual preferences. As such, employing emerging technologies, such as vision-detection processes, to interactively render features would enhance the user's computing experience when navigating the features positioned in a personalized page layout published in the display area.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computerized methods, graphical user interfaces (GUIs), and computer-readable media having computer-executable instructions embodied thereon, residing in an operating system, for managing and manipulating one or more features of a page layout presented on one or more display devices. In particular, intuitive techniques for arranging the features within the panes of a display area, by identifying and analyzing a user's common visual patterns when viewing content on a GUI workspace, are provided. Because, eye-tracking information provides valuable insights into how user's perceive content or how they scan a format of a page, harnessing this information (e.g., user-visual pattern) to optimize a layout, or visual design, of a page (e.g., home-page of a website, window surfaced by an application, and the like) will enhance user performance when navigating the page, and can increase conversion rates for online advertisers by optimally placing their ads within a display area of a browser window.

Generally, the process of interactively presenting features within the panes of the display area rendered in a GUI workspace includes inspecting portions of a memory of a computing device to discover a profile that accommodates a user-visual pattern. When the profile is not discovered, a default page layout is retrieved and communicated to the display device for presentation within the display area. If the profile is discovered, commonly viewed screen locations, based upon a frequency of eye fixation upon each of the screen locations, are ordered. Features that are contextually relevant to a state of an application that is rendering the display area are selected for presentation within the display area. The selected features are ranked based on predetermined criteria and each associated with the commonly viewed screen locations by comparing the ranking with the ordering. For instance, the highly-ranked features are paired with the screen locations that are most frequently targeted by a user's eye movements. A page layout is constructed by spatially placing the features in proximity to the screen locations associated therewith. Subsequently, the page layout is communicated to a display device for presentation within the display area.

BRIEF DESCRIPTION OF THE DRAWINGS

The present invention is described in detail below with reference to the attached drawing figures, wherein like reference numerals identify like components in the various figures, and wherein.

DETAILED DESCRIPTION

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods, graphical user interfaces (GUI's), and computer-readable media having computer-executable instructions embodied thereon, for employing emerging technologies, such as vision-detection processes, to interactively render features in positions within a display area, thereby enhancing a user's computing experience when navigating the features.

Accordingly, in one aspect, the embodiments of the present invention provide one or more computer-readable media having computer-executable instructions embodied thereon that, when executed, perform a method for arranging one or more features within a page layout presented at a graphical user interface (GUI) workspace. Initially, the method includes accessing a user-visual pattern stored in a profile and extracting from the user-visual pattern screen locations commonly viewed by the user during at least one computing session. In an exemplary embodiment, a page layout is constructed within a display area by implementing an allocation process. The allocation process may include, but is not limited to, the following procedures: selecting features to present to a user; and populating one or more panes within the page layout with the selected features, respectively, based on the commonly viewed screen locations. The constructed page layout may be presented in the display area rendered on a GUI workspace of a display device.

In another aspect, a computerized method for interactively presenting features within the panes of the display area rendered in a GUI workspace is provided. In embodiments, the method includes inspecting portions of a memory of a computing device to discover a profile that accommodates a user-visual pattern. When the profile is not discovered, a default page layout is retrieved and communicated to the display device for presentation within the display area. If the profile is discovered, commonly viewed screen locations, based upon a frequency of eye fixation upon each of the screen locations, are ordered. Features that are contextually relevant to a state of an application rendering the display area are selected for presentation within the display area. The selected features are ranked based on predetermined criteria and each associated with the commonly viewed screen locations by comparing the ranking with the screen-location ordering. For instance, the highly-ranked features are paired with the screen locations that are most frequently targeted by a user's eye movements. A page layout is constructed by spatially placing the features in proximity to the screen locations associated therewith. The page layout is communicated to a display device for presentation within the display area.

In yet another aspect, embodiments of the present invention relate to computer-readable media that have computer-executable instructions embodied thereon for presenting, on a display device, a graphical user interface (GUI) workspace configured to dynamically arrange features within a display area by inspecting a user-visual pattern. Initially, the GUI workspace includes the display area presented within confines of the GUI workspace. Typically, the display area is divided into individual content regions, where the content regions include a first pane and a second pane. The first pane publishes a first feature and substantially overlays a screen location most frequently targeted by a user's eye movements as derived from the user-visual pattern. In embodiments, the first feature is a primary-listed feature in a ranking based on predetermined criteria. The second pane publishes a second feature and substantially overlays a screen location that is second-most frequently targeted by a user's eye movements as derived from the user-visual pattern. In embodiments, the second feature is a secondary-listed feature in a ranking based on predetermined criteria.

The term "features," as used herein is not meant to be limiting, but may encompass any form of content that may be applied to a pane of a display area. For instance, the features selected by an application, when configured as a word-processing program, may include at least one of a toolbar, a scrollbar, or a document-editing panel. In another instance, the features selected by the application, when configured as a web browser, may include at least one of an advertisement, search results, or featured web addresses.

Having briefly described an overview of embodiments of the present invention, an exemplary operating environment suitable for implementing embodiments of the present invention is described below.

Figure 1:
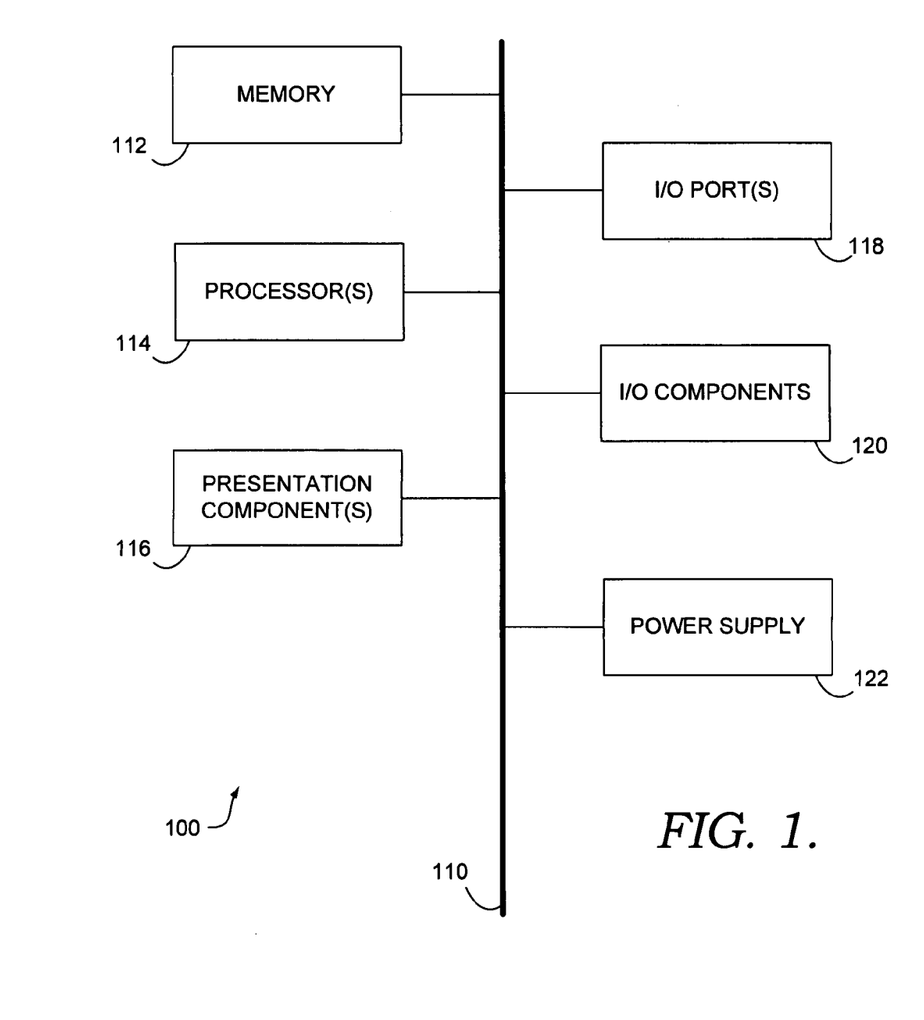
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing platforms where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
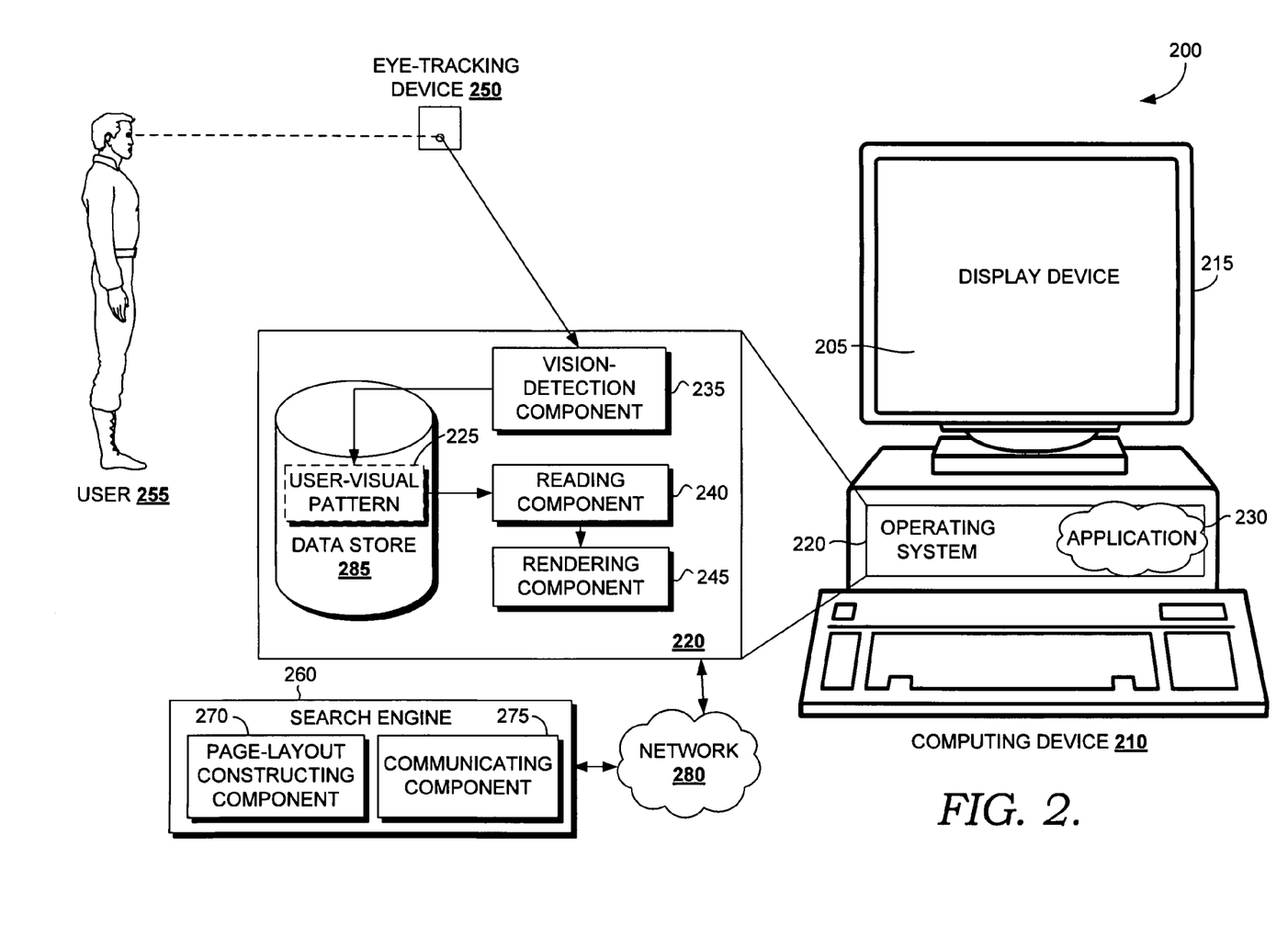
FIG. 2 is a schematic diagram of an exemplary system architecture suitable for use in implementing embodiments of the present invention.

Turning now to FIG. 2, a schematic diagram of an exemplary system architecture 200 suitable for use in implementing embodiments of the present invention is shown. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein. Further, logic within the operating system 220 supporting the exemplary system architecture 200 may be provided as a stand-alone product, as part of a software package, or any combination thereof.

Exemplary system architecture 200 includes a computing device 210 for generating and storing a user-visual pattern 225, and for rending a display area configured based on the user-visual pattern 225 within a GUI workspace 205. The computing device 210 may take the form of various types of computing devices. By way of example only, the computing device 210 may be a personal computing device (e.g., computing device 100 of FIG. 1), handheld device (e.g., personal digital assistant), consumer electronic device, various servers, and the like. Additionally, the computing device may comprise two or more electronic devices configured to share information therebetween.

In embodiments, the computing device 210 includes a display device 215, input devices, and hardware with an operating system 220 installed thereon. The computing device 210 is configured to present the GUI workspace 205 on the display device 215. The display device 215, which is operably coupled to the computing device 210, may be configured as any presentation component that is capable of presenting information to a user, such as a monitor, electronic display panel, touch-screen, and the like. In one exemplary embodiment, the GUI workspace 205 is configured to present a display area in various window states (not shown), and to render features within the display area according to a page layout. In embodiments, a design of the page layout is influenced by an application 230 stored at the computing device 210 and/or by a search engine 260 that is remotely located from the computing device 210.

The input devices (not shown) are configured to provide input(s) affecting, among other things, manipulation of the display area within the GUI workspace 205. Illustrative devices include a key pad, a mouse, a joystick, a microphone, the I/O components 120 of FIG. 1, or any other component capable of receiving a user input and communicating an indication of that input to the computing device 210. In another embodiment, the input devices include an eye-tracking device 250.

As discussed above, embodiments of the present invention generally relate to arranging features within a display area presented on the GUI workspace 205 based on the user-visual pattern 225. The user-visual pattern 225 may be developed and trained utilizing a vision-detection process implemented by the eye-tracking device 250 and associated software. The vision-detection process involves a procedure of measuring either a point of gaze (e.g., where a user 255 is looking) or motion of an eye relative to a display device. As used herein, the phrase "eye-tracking device 250" is not meant to be limiting, but may encompass any device that is configured for measuring either eye positions and/or eye movements. These measurements may include records of eye movements that expose screen locations where a user's 255 attention is drawn. In embodiments, the screen locations may correspond to elements displayed on the GUI workspace 205. Configurations of the eye-tracking device 250 may include, but are not limited to, the following: special contact lenses with embedded mirrors or magnetic field sensors; video-based eye trackers that use corneal reflection, or the center of the pupil, as objects to track over time; cameras that capture eye movement on a frame-by-frame basis; and electrical-potential mechanisms that estimate a gaze direction of a user.

In one instance, the eye-tracking device 250 may be a sensor built into the display device 215 that sends and receives reflections of infrared light to the user's 255 eyes. The infrared light allows for generating and training the user-visual pattern 225 by recording movements of user's 255 pupils during a computing session. As used herein, the phrase "computing session" broadly encompasses any time the user 255 views screen content such as a website, application, image, video, marketing piece, etc.

Typically, the eye-tracking device 250 is supported by a vision-detection component 235 that implements the vision-detection process and that detects and records eye movements over time, thereby capturing fixations (when the eye gaze pauses in a certain position) and saccades (when the eye moves to another position). During the computing session, the user 255 may perform multiple series of saccades and fixations, or scan-paths, that are recorded as the new user-visual pattern 225 or used to train the current user-visual pattern 225.

In other embodiments, the vision-detection component 235 may be utilized by the eye-tracking device 250 to track views or monitor fixations of the user's 255 eyes when scanning on-screen content. In addition, the vision-detection component 235 may record indicia of this information as the user-visual pattern 225 within a data store 285 on the computing device 210 or at a distributed location. As more fully discussed below, algorithm(s) (e.g., a statistical analysis model) may be applied to the user-visual pattern 225 to identify one or more areas of interest that the user 255 visually targets within the GUI workspace 205. Accordingly, these algorithm(s) facilitate pinpointing barriers and distractions that prevent the user 255 from efficiently finding desired content, or features, within a page layout of the display area.

As used herein, the phrase "user-visual pattern 225" is not meant to be limiting, but may encompass any information (e.g., raw eye-movement data, processed commonly viewed screen locations, historical data of user vision, etc.) gathered and recorded by the eye-tracking device 250, and/or manipulated by the vision-detection process. The user-visual pattern 225 may be stored in various formats. For instance, the user-visual pattern 225 may take the form of a gaze plot that reflects the visual path that individual users take on the GUI workspace 205. By analyzing individual gaze plots, patterns that reveal the order in which a user views the GUI workspace 205, or display area rendered therein, can be identified. Often, a mismatch exists between where the user 255 expects to find links, controls, or content and where they are actually placed on the page layout of the display area. Accordingly, evaluation of the user-visual patterns 225 (e.g., utilizing the vision-detection component 235) helps recognize these mismatches and facilitates recommending changes in the way content and navigational elements are spatially arranged or aligned on the page layout. For instance, if the gaze plot indicates that the user 255 exhibits substantial back-and-forth movement when viewing a display area, a proper evaluation may suggest placing features displayed on the page layout closer together.

In another instance, the user-visual pattern 225 may take the form of a screen location that reflects sections of the display area that are flagged based on how frequently the user 255 focuses on a specific area. These screen locations may be stored as points on an X and Y axis, or a plot on a Cartesian plane, which easily translate to an area of the GUI display 205. Although several different configurations of the user-visual pattern 225 have been described, it should be understood and appreciated by those of ordinary skill in the art that other types of suitable parameters that describe the visual interaction of a person may be used, and that embodiments of the present invention are not limited to those user-visual patterns 225 described herein.

In instances, the vision-detection process relies on human-computer interaction technology to determine what the user 255 first observes when viewing a display area and what the user 255 most often observes during an entire interaction when conducting a computing session. From this information, the vision-detection process utilizes a correlation technique to map the user's eye movement to screen locations within the GUI workspace 205 and to store the screen locations in association with the user-visual pattern 225. In one instance, storing in association with the user-visual pattern 225 involves writing the screen locations as the user-visual pattern 225. In another instance, storing in association with the user-visual pattern 225 involves utilizing the eye-tracking device 250 to track subsequent eye movements of the user 255, correlating the subsequent eye movements to additional screen locations, and updating the user-visual pattern 225 by incorporating the additional screen locations therein. Accordingly, a page layout rendered within a display area may be dynamically adjusted in accordance with the updated user-visual pattern 225.

Further, the vision-detection process may decipher the screen locations that are commonly viewed in accordance with the most popular screen locations that the user 255 focuses upon. By way of example, the longer the user 255 scans a particular screen location (e.g., message, content region, and the like) the higher the perceived interest in that content or information. Accordingly, these screen locations of perceived interest may be identified as the commonly viewed screen locations. The commonly viewed screen locations may be further distilled by applying a statistical analysis model. The statistical analysis model may consider the eye-tracking data, within the user-visual pattern 225, collected over a period of time to derive the commonly viewed screen locations and to distil the most frequently targeted screen locations therefrom. Further, the statistical analysis model may order the commonly viewed screen locations based upon a frequency of eye fixation upon each of the screen locations. Accordingly, the ordering generally reflects what the user 255 pays attention to and what the user 255 misses on the GUI workspace 205.

The user-visual pattern 225 may be stored at a data store 285. The data store 285 is generally configured to store information associated with the user-visual pattern 225 and/or data collected from the eye-tracking device 250, discussed above. In various embodiments, such information may include, without limitation, eye movements over time, saccades, fixations, a ranking of screen locations, and the like. In addition, the data store 285 may be configured to be searchable for suitable access of stored information. For instance, the data store 285 may be recursively searchable for commonly viewed screen locations according to the ranking. It will be understood and appreciated by those of ordinary skill in the art that the information stored in the data store 285 may be configurable and may include any information relevant to the vision-detection process. The content and volume of such information are not intended to limit the scope of embodiments of the present invention in any way. Further, though illustrated as a single, independent component, the data store 285 may, in fact, be a plurality of databases, for instance, a database cluster, portions of which may reside on a computing device 210, a search engine 260, another external computing device (not shown), and/or any combination. In an exemplary embodiment, the search engine 260 is allowed to access the data store 285 to extract screen locations from the user-visual pattern 225 for composing a page layout via the allocation process (e.g., utilizing a page-layout constructing component 270).

The operating system (OS) 220 refers generally to the software that manages the sharing of the resources of the computing device 210 and provides programmers with an interface used to access those resources. In operation, the operating system 220 interprets system data and detects user inputs (e.g., via the eye-tracking device 250), and underlies the operation of components 235, 240, and 245. In an exemplary embodiment, the operating system 220 accommodates an application 230, a vision-detection component 235, a reading component 240, and a rendering component 245. In other embodiments, the components 235, 240, and 245 are fully or partially incorporated within the application 230 and/or within the search engine 260.

This operating-system structure of the operating-system 220 is but one example of a suitable structure that may be run on the computing device 210 and is not intended to suggest any limitation as to the scope of use or functionality of the invention. Neither should the illustrated operating system 220 be interpreted as having any dependency or requirement relating to any one or combination of the components 235, 240, and 245 as illustrated. In some embodiments, one or more of the components 235, 240, and 245 may be implemented as stand-alone applications. In other embodiments, one or more of the components 235, 240, and 245 may be integrated directly into the display device 215 of the computing device 210, the application 230, or a combination thereof. By way of example only, the rendering component 245 may be housed in association with the display device 215. It will be understood by those of ordinary skill in the art that the components 235, 240, and 245 illustrated in FIG. 2 are exemplary in nature and in number and should not be construed as limiting.

Any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one display device 215 is shown, many more may be operably coupled to the computing device 210, thereby functioning in conjunction to present the GUI workspace 205).

In embodiments, the reading component 240 is configured to access the user-visual pattern 225 stored in a profile and extract from the user-visual pattern 225 screen locations commonly viewed by the user 255 during at least one computing session. In one instance, accessing the user-visual pattern 225 may include inspecting portions of a memory of a computing device 210 to discover a profile that accommodates a user-visual pattern 225. Incident to discovering the profile, the reading component 240 may order the commonly viewed screen locations based upon a frequency of eye fixation upon each of the screen locations. This information may be sent to the rendering component 245, which may be located on the operating system 220, the application 230, the search engine 260, or any combination thereof. In an instance where the profile is not discovered, the reading component 240 may alert the application 230 or the search engine 260 to retrieve a default page layout and communicate the default page layout (e.g., utilizing the communication component 275) to the display device 215 for presentation within the display area.

In embodiments, the search engine 260 is designed for searching for information on the Internet for gathering Internet search results in response to a user-submitted query that may be submitted through a website. In one embodiment, the search engine 260 includes one or more web crawlers that mine available data (e.g., newsgroups, databases, or open directories) accessible via the Internet and build a page layout containing featured web addresses, advertisements, search results, along with the subject matter of web pages identified as the search results that are relevant to search terms within the user-submitted query. The search engine 260 may be accessed by Internet users through the application 230 (e.g., a web-browser application). Accordingly, the user 255 may conduct an Internet search by submitting search terms at a query-entry area on a browser window presented by the application 230 that is operably coupled with the search engine 260. Further, the search engine 260 may employ a page-layout constructing component 270 for composing the page layout and the communication component 275 for delivering the page layout to the rendering component 245 for presentation at the GUI workspace 205.

In an exemplary embodiment, the page layout constructing component 270 is configured to construct a page layout within a display area by implementing the allocation process. Typically, the allocation process allocates panes within a page layout for receiving features. Generally, the page layout governs the position and dimensions of the panes within the display area. The allocation process may include the following procedures, in no particular order: selecting the features to present to the user 255; and populating the panes within the page layout with the selected features, respectively, based on the commonly viewed screen locations provided from the reading component 240. In other embodiments, the allocation process includes, but is not limited to, the following procedures: associating the commonly viewed screen locations with predefined content regions of an application window; and identifying the panes within the page layout that substantially align with the predefined content regions. Accordingly, the positions in which the features are placed correspond with the screen locations being frequently visited by the eyes of the user 255.

In one instance, selecting the features to present to the user 255 involves enumerating the features that are contextually relevant to a state of the application 230, which is configured for rendering the display area on the GUI workspace 205, and ranking the enumerated features based on predetermined criteria. By way of example, the predetermined criteria may include at least one of calculated advertisement revenue, click-through rate, or bid value. The state of the application 230 generally relates to the commands being currently executed by the application 230. For instance, if the application is a web browser, the state of the application may relate to retrieving and presenting search results. In another instance, if the application is a word-processing program, the state of the application may relate to editing a document. In other words, features that are candidates for presentation are selected based on the context of an online session or a computing session.

In embodiments, the procedure of populating the panes within the page layout with the selected features may involve ordering the commonly viewed screen locations leading with a most-frequently-targeted screen location and mapping the commonly viewed screen locations with the ranked features. In one instance, a highest ranked feature may be matched with the most-frequently-targeted screen location. Accordingly, a feature deemed most important is placed in a position within the display area that receives a high level of visual attention from the user 255. Ranking the features may include selecting features that are contextually relevant to the state of the application 230, ranking the selected features based on the predetermined criteria, and associating each of the features with the commonly viewed screen locations by comparing the ranking with the ordering. As a result, the page layout may be constructed by placing the features in proximity with the screen locations associated therewith.

In one instance, the page-layout constructing component 270 is configured to rearrange the features based on changes to the dimensions of the display area (e.g., upon recognizing an instruction to resize/minimize/maximize the display area). The process of rearranging may include deriving new dimensional parameters from the display area, enumerating a number of the panes in which to divide the display area based on the dimensional parameters, and selecting a number of the features to publish that coincides with the number of the panes. Upon selecting the new number of features to publish, a new number of the commonly viewed screen locations may be selected, where the new number of screen locations coincides with the number of the panes. The panes may be positioned within the display area such that each of the panes substantially overlays each of the selected screen locations, respectively. Next, each of the selected features is placed within each of the arranged panes. This revised page layout may be communicated to the display device 215 (e.g. utilizing the rendering component 245) for presentation within the display area.

In another instance, the page-layout constructing component 270 is configured to dynamically repopulate the features based on changes to the commonly viewed screen locations (e.g., upon recognizing a message from the reading component 240 that the user-visual pattern 225 is updated). The process of dynamically repopulating may include detecting an update to the user-visual pattern 225 and dynamically modifying the page layout in accordance with the updated user-visual pattern. As such, the system architecture 200 may be designed to act intelligently by adjusting the page layout to correspond with the user-visual pattern 225 as it is modified in real time. Accordingly, the page layout is responsive to current user-interaction and promotes continued user engagement with the features of the display area.

In yet another instance, the page-layout constructing component 270 is configured to select a template layout from a set of available templates for implementation as the page layout. The process of selecting a template layout may involve retrieving a predefined number of the commonly viewed screen locations, and selecting from the set of available templates a particular template whose format of panes is designed to correspond with positions of the retrieved commonly viewed screen locations. Accordingly, the format of panes within the selected template may be populated with the appropriate features and the template may be offered for rendering within the display area. If changes to the positions of the retrieved commonly viewed screen locations are recognized, the format of the selected template may be dynamically tuned to match the changes in position.

As discussed above, the communicating component 275 may be configured to deliver the page layout, with the features embedded therein, to the rendering component 245 for presentation on the GUI workspace 205. In embodiments, the page layout is delivered via a network 280. The network 280 generally serves to operably couple components of the exemplary system architecture 200. Operably coupling may comprise interconnecting the components by any method known in the relevant field. For instance, the search engine 260 and the computing device 210 may be operably coupled via a distributed computing environment that includes multiple computing devices coupled with one another via one or more networks. In embodiments, the network 280 may include, without limitation, one or more local area networks (LANs) and/or wide area networks (WANs). Such networking environments are commonplace in offices, enterprise-wide computer networks, intranets, and the Internet. Accordingly, the network 280 is not further described herein.

Figure 3:
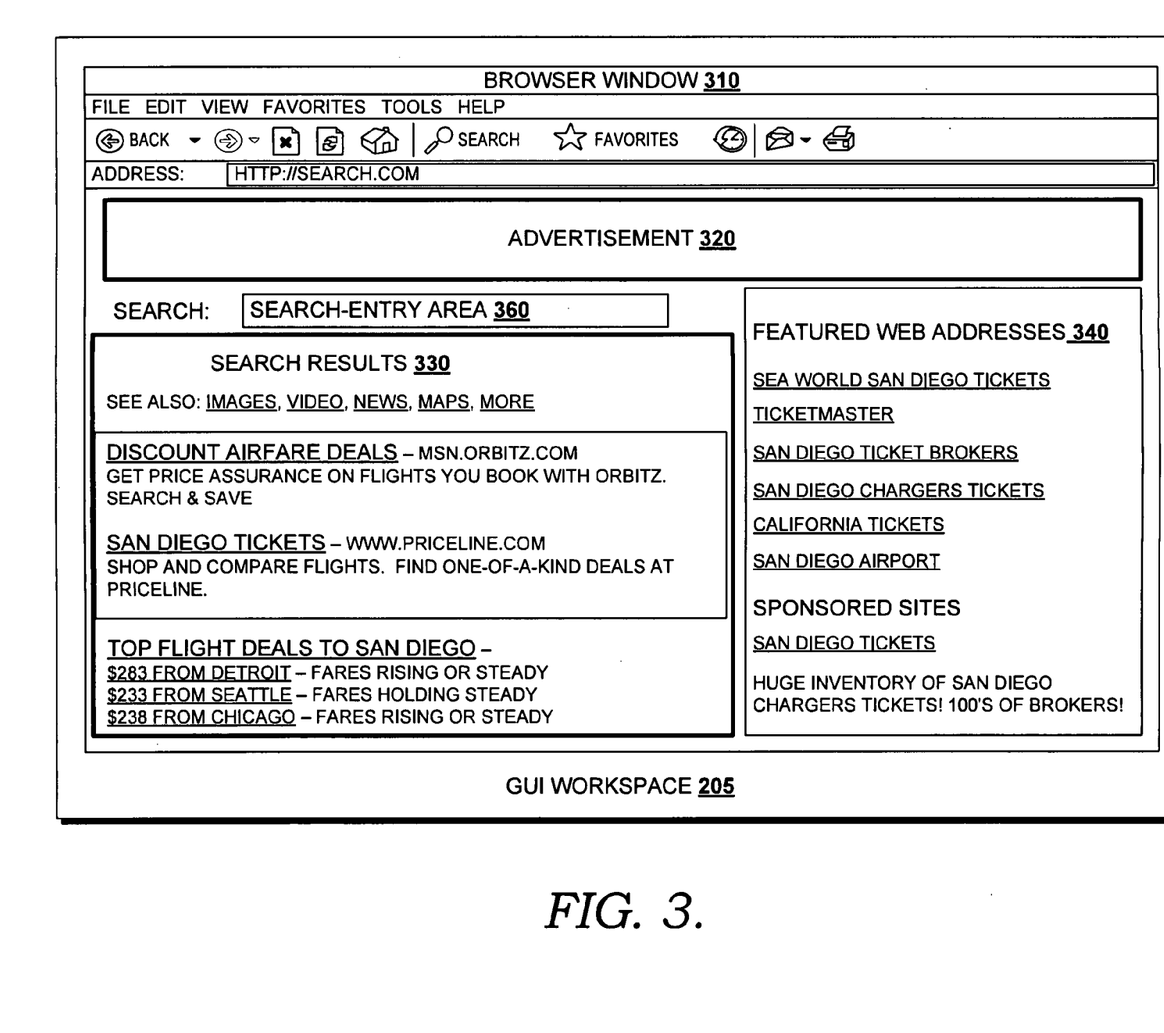
FIG. 3 is a screen display illustrating features placed on a display area configured as a browser window rendered by a search engine, in accordance with embodiments of the present invention.

Turning now to FIG. 3, a screen display is shown that illustrates features 320, 330, and 340 placed on a display area configured as a browser window 310 rendered by a search engine (e.g., utilizing the search engine 260 of FIG. 2), in accordance with embodiments of the present invention. As such, the application 230 of FIG. 2 is configured as a web browser, the display area is configured as the browser window 310, and the features populated on the panes of the browser window 310 comprise an advertisement 320, search results 330, and featured web addresses 340. These features may be placed in accordance with the commonly viewed screen locations extracted from the user-visual pattern 225 described above in FIG. 2. In embodiments, a query may be submitted by a user at a search-entry area 360 within the browser window 310. Upon detecting the query, the search engine may retrieve search results 330 that satisfy the query. The search engine may also remotely access the profile at the computing device 210 of FIG. 2 to read the user-visual pattern. Based on the visual pattern, the page layout is developed, which dictates the pane(s) within the browser window 310 that should receive the search results 330.

In other embodiments, the browser window is presented within the confines of the GUI workspace 205. In particular, the browser window is divided into individual content regions that include, at least, a first pane, a second pane, and a third pane. The first pane is illustrated as a top banner that publishes the advertisement feature 320. In this example, the advertisement feature 320 is ranked the highest of the features selected for placement, in order to maximize revenue for a website. Accordingly, the first pane that receives the advertisement feature 320 also overlays a screen location most frequently targeted by a user's eye movements, as derived from the user-visual pattern. In this example, the featured web addresses 340 are ranked the second highest of the features selected for placement, in order to direct a customer to websites of sponsor companies. Accordingly, the second pane that receives the featured web addresses 340 also overlays a screen location that is the second-most frequently targeted by a user's eye movements, as derived from the user-visual pattern. In one instance, the featured web addresses 340 are a secondary-listed feature in a ranking based on the predetermined criteria, as more fully discussed above. The third pane is allocated by the allocation process to receive the search results 330, which is the lowest-ranked feature in this example. Accordingly, the third pane is located proximately to the third-most frequently targeted screen location.

Figure 4:
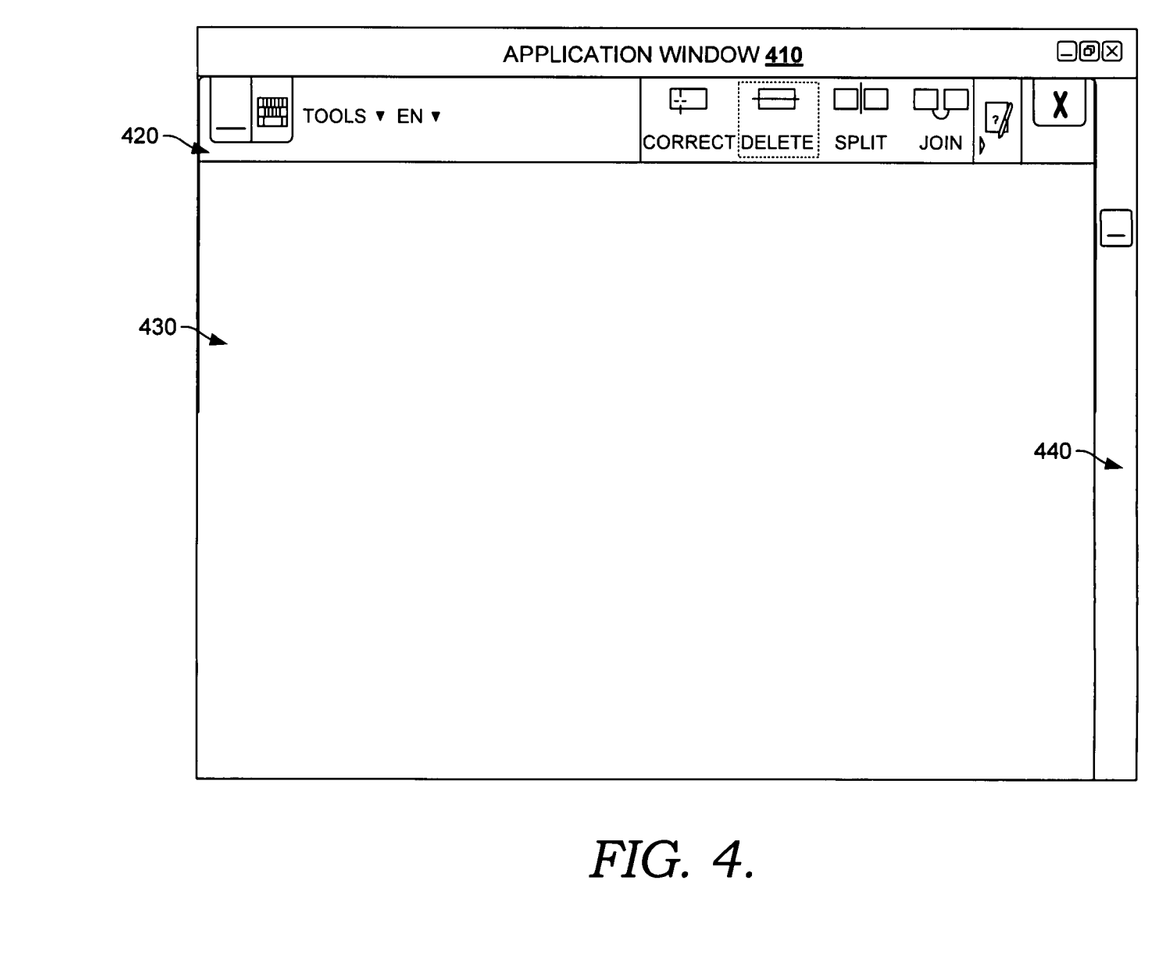
FIG. 4 is a screen display illustrating features placed on a display area configured as an application window rendered by an application, in accordance with embodiments of the present invention.

Turning now to FIG. 4, a screen display is shown illustrating features 420, 430, and 440 placed on a display area configured as an application window 410 rendered by an application (e.g., the application 230 of FIG. 2), in accordance with embodiments of the present invention. In this embodiment, the application is configured as a word-processing program and the display area is configured as the application window 410. Accordingly, as rendered by this exemplary application, the features populated on the panes of the application window 410 comprise, at least, a toolbar 420, a scrollbar 440, and a document-editing panel 430. These features are placed consistent with a page layout developed by the application.

As discussed more fully above, developing the page layout involves implementing the allocation process that includes locally accessing the profile within the computing device to read the user-visual pattern upon launching the application. The page layout is generally developed based on the user-visual pattern and utilized to configure the panes and/or features of the application window 410. In this example, the toolbar 420, the scrollbar 440, and the document-editing panel 430 are ranked and compared to the ordering of the commonly viewed screen locations. Based on a result of the comparison, the features are placed, as illustrated, in the panes that overlay the appropriate screen locations.

Typically, the commonly viewed screen locations are those that a user, or a survey of users, most frequently focus upon. In embodiments, the application may continuously, or periodically, review the user-visual pattern to identify any updates thereto. If an update shows a shift in the coordinates of the commonly viewed screen locations, the application may dynamically reorganize the features in real time. Or, the application may reorganize the features upon the expiration of a timer, upon receiving an indication to refresh, during the next launch of the application, etc.

Figure 5:
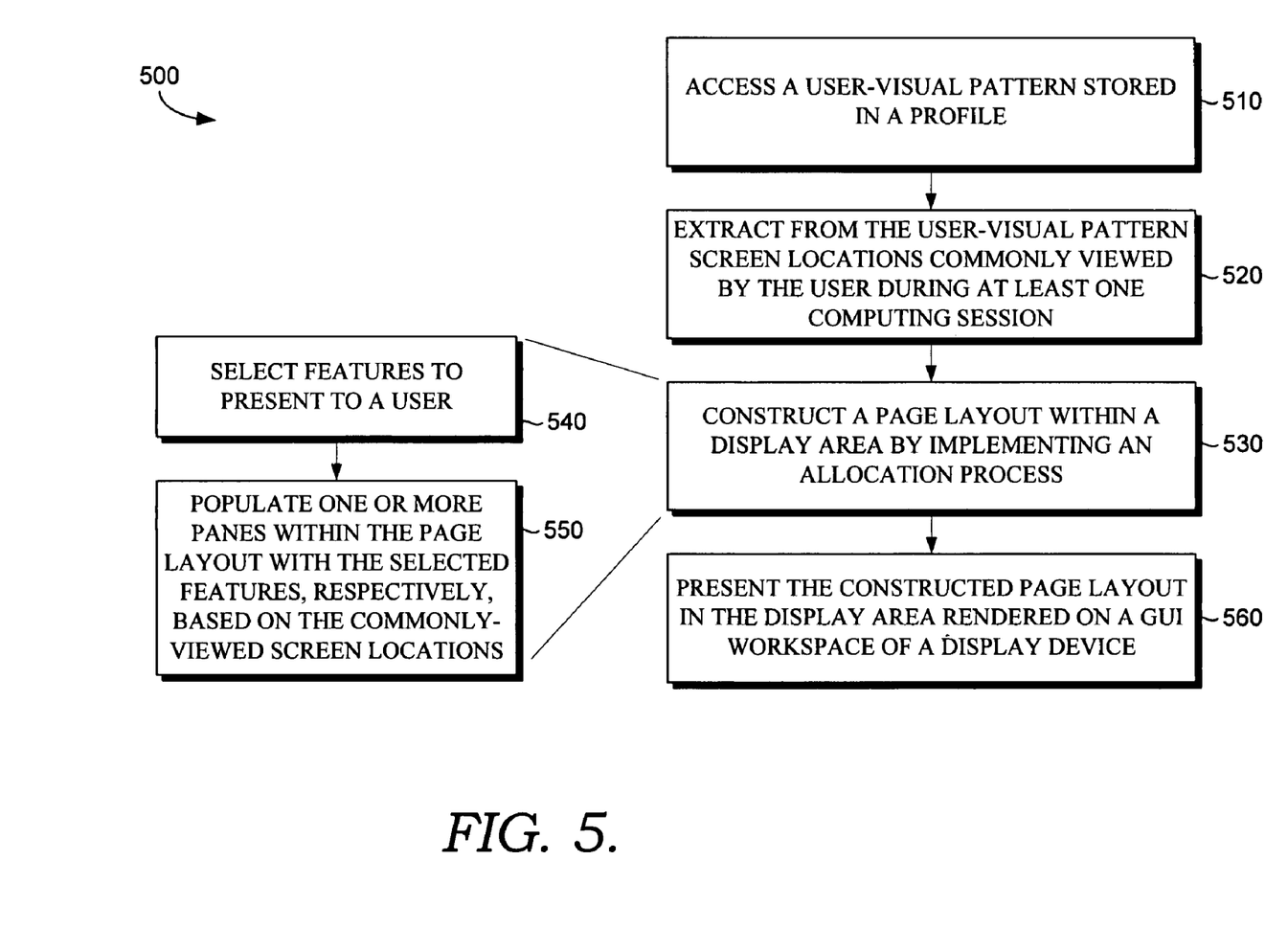
FIG. 5 is a flow diagram illustrating an overall method for arranging one or more features within a page layout presented at a graphical user interface (GUI) workspace, in accordance with an embodiment of the present invention.

With reference to FIG. 5, a flow diagram is shown illustrating an overall method 500 for arranging one or more features within a page layout presented at a graphical user interface (GUI) workspace, in accordance with an embodiment of the present invention. Initially, the method 500 includes accessing a user-visual pattern stored in a profile (see block 510) and extracting from the user-visual pattern screen locations commonly viewed by the user during at least one computing session (see block 520). In an exemplary embodiment, a page layout is constructed within a display area by implementing an allocation process, as depicted at block 530. The allocation process may include, but is not limited to, the following procedures: selecting features to present to a user (see block 540); and populating one or more panes within the page layout with the selected features, respectively, based on the commonly viewed screen locations (see block 550). As depicted at block 560, the constructed page layout may be presented in the display area rendered on a GUI workspace of a display device.

Figure 6:
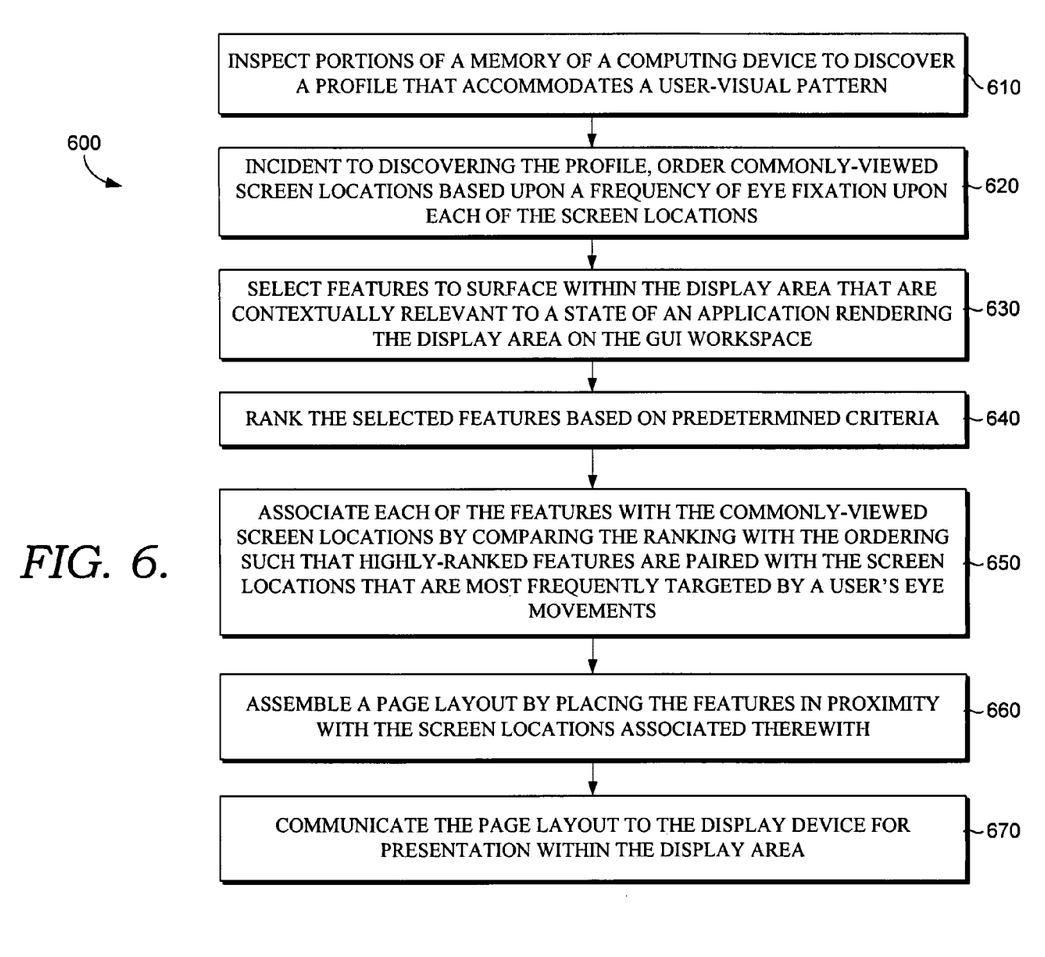
FIG. 6 is a flow diagram illustrating an overall method for interactively presenting features within one or more panes of a display area rendered in a GUI workspace, in accordance with an embodiment of the present invention.

Referring to FIG. 6, a flow diagram is shown illustrating an overall method 600 for interactively presenting features within one or more panes of a display area rendered in a GUI workspace, in accordance with an embodiment of the present invention. In embodiments, the method 600 includes inspecting portions of a memory of a computing device to discover a profile that accommodates a user-visual pattern, as depicted at block 610. When the profile is not discovered, a default page layout is retrieved and communicated to the display device for presentation within the display area. If the profile is discovered, commonly viewed screen locations, based upon a frequency of eye fixation upon each of the screen locations, are ordered. This is depicted at block 620.

Features that are contextually relevant to a state of an application rendering the display area are selected for presentation within the display area, as depicted at block 630. The selected features are ranked based on predetermined criteria (see block 640) and each associated with the commonly viewed screen locations by comparing the ranking with the ordering (see block 650) For instance, the highly-ranked features are paired with the screen locations that are most frequently targeted by a user's eye movements. As depicted at block 660, a page layout is constructed by spatially placing the features in proximity to the screen locations associated therewith. The page layout is communicated to a display device for presentation within the display area, as depicted at block 670.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media having computer-executable instructions embodied thereon that, when executed, perform a method for arranging one or more features within a page layout presented at a graphical user interface (GUI) workspace, the method comprising:
   accessing a user-visual pattern stored in a profile;
   extracting from the user-visual pattern screen locations commonly viewed by the user during at least one computing session;
   constructing a page layout within a display area by implementing an allocation process comprising:
      (a) selecting features to present to a user based on the user's eyes historically fixated on the features; and
      (b) populating one or more panes with the features at a location within the page layout determined to have historically received a high level of visual attention from the user;
   presenting the constructed page layout in the display area rendered on a GUI workspace of a display device.

2. The one or more computer-readable media of claim 1, the method further comprising:
   associating the commonly viewed screen locations with predefined content regions of an application window; and
   identifying the one or more panes within the page layout that substantially align with the predefined content regions.

3. The one or more computer-readable media of claim 2, wherein selecting the features to present to a user comprises:
   enumerating the features that are contextually relevant to a state of an application rendering the display area on the GUI workspace; and
   ranking the enumerated features based on predetermined criteria.

4. The one or more computer-readable media of claim 3, wherein the predetermined criteria comprise at least one of calculated advertisement revenue, click-through rate, or bid value.

5. The one or more computer-readable media of claim 4, wherein the application is configured as a web browser, the display area is configured as a browser window, and the features populated on the one or more panes of the browser window comprise at least one of an advertisement, search results, or featured web addresses.

6. The one or more computer-readable media of claim 3, wherein the application is configured as a computer program, the display area is configured as an application window, and the features populated on the one or more panes of the application window comprise at least one of a toolbar, a scrollbar, or a document-editing panel.

7. The one or more computer-readable media of claim 3, wherein populating one or more panes within the page layout with the selected features comprises:
   ordering the commonly viewed screen locations leading with a most-frequently-targeted screen location; and
   mapping the commonly viewed screen locations with the ranked features such that a highest-ranked feature is matched with the most-frequently-targeted screen location.

8. The one or more computer-readable media of claim 7, the method further comprising:
   deriving dimensional parameters from the display area;
   enumerating a number of the one or more panes in which to divide the display area based on the dimensional parameters;
   selecting a number of the features to publish that coincides with the number of the one or more panes;
   selecting a number of the commonly viewed screen locations that coincides with the number of the one or more panes;
   arranging the one or more panes within the display area such that each of the one or more panes substantially overlays each of the selected screen locations, respectively; and
   placing each of the selected features within each of the one or more arranged panes.

9. A computerized method for interactively presenting features within one or more panes of a display area rendered in a GUI workspace, the method comprising:

inspecting portions of a memory of a computing device to discover a profile that accommodates a user-visual pattern;

incident to discovering the profile, ordering commonly viewed screen locations based upon an historical frequency of eye fixation upon each of the screen locations;

selecting features to surface within the display area that are contextually relevant to a state of an application rendering the display area on the GUI workspace;

ranking the selected features based on predetermined criteria;

associating each of the features with the commonly viewed screen locations by comparing the ranking with the ordering such that highly-ranked features are paired with the screen locations that are most frequently targeted by a user's historically tracked eye movements and fixations;

assembling a page layout by placing the features in proximity with the screen locations associated therewith; and communicating the page layout to a display device for presentation within the display area.

10. The method of claim 9, the method further comprising:
failing to discover the profile;
retrieving a default page layout; and
communicating the default page layout to the display device for presentation within the display area.

11. The method of claim 9, further comprising:
employing an eye-tracking device to generate the user-visual pattern by implementing a vision-detection process, the vision detection process comprising:
(a) monitoring movement of the user's eyes over a time; and
(b) utilizing a correlation technique to map the user's eye movement to the screen locations; and
storing the screen locations as the user-visual pattern.

12. The method of claim 11, further comprising:
utilizing the eye-tracking device to track subsequent eye movements of the user;
updating the user-visual pattern by incorporating the subsequent eye movements therein; and
dynamically modifying the page layout in accordance with the updated user-visual pattern.

13. The method of claim 12, further comprising locally accessing the profile within the computing device to read the user-visual pattern upon launching an application, wherein the page layout that is developed based on the user-visual pattern is utilized to configure an application window.

14. The method of claim 9, further comprising:
receiving a query submitted by a user at a browser window; and
remotely accessing the profile at the computing device to read the user-visual pattern upon retrieving search results that satisfy the query, wherein the page layout that is developed based on the user-visual pattern dictates a pane within the browser window to receive the search results.

15. The method of claim 14, further comprising:
ranking the search results leading with a most relevant result based, in part, on the query;
employing the user-visual pattern to rerank the search results such that the most relevant result is paired with a most frequently targeted screen location; and
rendering the search results in an order consistent with the reranking.

16. The method of claim 15, further comprising:
reconfiguring a position and dimensions of the one or more panes of the display area to substantially overlay the commonly viewed screen locations; and
writing the one or more reconfigured panes to the page layout.

17. The method of claim 16, further comprising applying a statistical analysis model to the user-visual pattern to derive the commonly viewed screen locations and to distil the most-frequently-targeted screen locations therefrom.

18. One or more computer-readable media having computer-executable instructions embodied thereon for presenting on one or more display devices a graphical user interface (GUI) workspace configured to dynamically arrange features within a display area by inspecting a user-visual pattern, the GUI workspace comprising:

the display area presented within confines of the GUI workspace, wherein the display area is divided into individual content regions, wherein the content regions comprise a first pane and a second pane;

the first pane publishing a first feature, wherein the first pane overlays a screen location most frequently targeted by a user's eye movements as derived from the user-visual pattern, wherein the first feature is a primary-listed feature in a ranking based on predetermined criteria that include a calculated revenue, click-through rate, or bid value associated with an advertisement; and the second pane publishing a second feature, wherein the second pane overlays a screen location second-most frequently targeted by a user's eye movements as derived from the user-visual pattern, wherein the second feature is a secondary-listed feature in a ranking based on predetermined criteria.

19. The media of claim 18, wherein the content regions comprise a third pane, the third pane publishing a third feature, wherein the third pane overlays a screen location third-most frequently targeted by a user's eye movements as derived from the user-visual pattern, wherein the third feature is a tertiary-listed feature in a ranking based on predetermined criteria.

20. The media of claim 19, wherein the first, second, and third panes are configured as rectangular-shaped objects, and wherein the primary-listed feature includes an advertisement, the secondary-listed feature includes featured web addresses, and the tertiary-listed feature comprises search results.

* * * * *